United States Patent
Kurokawa

(10) Patent No.: US 9,521,293 B2
(45) Date of Patent: Dec. 13, 2016

(54) MANAGEMENT APPARATUS, MANAGEMENT SYSTEM, OBJECT MANAGEMENT METHOD, AND COMPUTER-READABLE STORAGE MEDIUM

(71) Applicant: Kaname Kurokawa, Chiba (JP)

(72) Inventor: Kaname Kurokawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/480,888

(22) Filed: Sep. 9, 2014

(65) Prior Publication Data

US 2015/0077797 A1 Mar. 19, 2015

(30) Foreign Application Priority Data

Sep. 17, 2013 (JP) ................. 2013-192432

(51) Int. Cl.
| | |
|---|---|
| G06F 3/12 | (2006.01) |
| H04N 1/32 | (2006.01) |
| H04N 1/00 | (2006.01) |
| G06K 17/00 | (2006.01) |
| G06K 7/10 | (2006.01) |
| G07C 9/00 | (2006.01) |
| G06K 7/00 | (2006.01) |

(52) U.S. Cl.
CPC ........ *H04N 1/32539* (2013.01); *G06K 7/0095* (2013.01); *G06K 7/10316* (2013.01); *G06K 2017/0045* (2013.01); *G06K 2017/0074* (2013.01); *G07C 9/00896* (2013.01); *H04N 1/00342* (2013.01); *H04N 1/32138* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,936,527 | A * | 8/1999 | Isaacman et al. | 340/572.1 |
| 6,600,418 | B2 * | 7/2003 | Francis | G06K 17/00 340/10.1 |
| 7,382,259 | B2 * | 6/2008 | Yun | 340/572.1 |
| 7,506,250 | B2 * | 3/2009 | Hull et al. | 358/1.16 |

(Continued)

FOREIGN PATENT DOCUMENTS

JP   2006-103284   4/2006

*Primary Examiner* — Miya J Cato

(74) *Attorney, Agent, or Firm* — Oblon, McClelland, Maier & Neustadt, L.L.P.

(57) ABSTRACT

A management apparatus includes a search part that requests a plurality of communication devices to search for a terminal device to obtain search information from a communication device that detects the terminal device via communication. The search information includes object identifying information for identifying an object to be managed to which the terminal device is attached, location information regarding a location where the object locates, and storage location information indicating a storage location of the object. The terminal device stores the object identifying information and the storage location information. The management apparatus also includes a determination part that determines whether the object is stored at the storage location based on the search information; and an output part that outputs a result of the determination.

16 Claims, 14 Drawing Sheets

| ID | TYPE | TIME AND DATE | NAME | LOCATION | STORAGE LOCATION | USER | REMARKS |
|---|---|---|---|---|---|---|---|
| Paper 1 | PAPER | XXXX/XX/XX | AAAAAA.Doc | MFP | RACK A | User A | |
| Paper 1 | PAPER | XXXX/XX/XX | AAAAAA.Doc | RACK A | RACK A | | |
| Paper 1 | PAPER | XXXX/XX/XX | AAAAAA.Doc | DOOR A | RACK A | | |
| Paper 1 | PAPER | XXXX/XX/XX | AAAAAA.Doc | DOOR B | RACK A | | |
| | | | | | | | |
| | | | | | | | |
| | | | | | | | |

(56) References Cited

U.S. PATENT DOCUMENTS

| | | | |
|---|---|---|---|
| 2004/0080772 A1* | 4/2004 | Snyders | G06F 21/608 358/1.14 |
| 2005/0280539 A1* | 12/2005 | Pettus | G06K 19/0672 340/572.1 |
| 2009/0262382 A1* | 10/2009 | Nobutani | 358/1.15 |
| 2009/0315717 A1* | 12/2009 | Soomro | G06K 7/0008 340/572.1 |
| 2010/0060453 A1* | 3/2010 | Kushida | G06Q 10/087 340/572.1 |
| 2010/0060927 A1* | 3/2010 | Ichikawa et al. | 358/1.15 |
| 2010/0073134 A1* | 3/2010 | Chikada | 340/5.86 |
| 2011/0140857 A1* | 6/2011 | Hull | G06F 17/30876 340/10.1 |
| 2011/0286022 A1* | 11/2011 | Kakitsuba | 358/1.13 |
| 2014/0043144 A1 | 2/2014 | Kurokawa | |
| 2014/0118117 A1* | 5/2014 | Zomchek | G01S 5/14 340/10.5 |

* cited by examiner

| ID | TYPE | TIME AND DATE | NAME | LOCA-TION | STORAGE LOCATION | USER LAST OPERATED | STATE | MESSAGE |
|---|---|---|---|---|---|---|---|---|
| Paper1 | PAPER | XXXX/XX/XX | AAAAAA.Doc | RACK A | RACK A | | NORMAL | KEPT SUITABLY |

FIG.7

| ID | TYPE | TIME AND DATE | NAME | LOCA-TION | STORAGE LOCATION | USER LAST OPERATED | STATE | MESSAGE |
|---|---|---|---|---|---|---|---|---|
| Paper 1 | PAPER | XXXX/XX/XX | AAAAAA.Doc | RACK B | RACK A | | ABNOR-MAL | STORED AT DIFFERENT LOCATION |

FIG.9

| ID | TYPE | TIME AND DATE | NAME | LOCA-TION | STORAGE LOCATION | USER | REMARKS |
|---|---|---|---|---|---|---|---|
| Paper 1 | PAPER | XXXX/XX/XX | AAAAAA.Doc | MFP | RACK A | User A | |
| Paper 1 | PAPER | XXXX/XX/XX | AAAAAA.Doc | RACK A | RACK A | | |
| Paper 1 | PAPER | XXXX/XX/XX | AAAAAA.Doc | DOOR A | RACK A | | |
| Paper 1 | PAPER | XXXX/XX/XX | AAAAAA.Doc | DOOR B | RACK A | | |
| | | | | | | | |
| | | | | | | | |

FIG.13

| ID | TYPE | TIME AND DATE | NAME | LOCA-TION | STORAGE LOCATION | USER | REMARKS |
|---|---|---|---|---|---|---|---|
| Paper 1 | PAPER | XXXX/XX/XX | AAAAAA.Doc | MFP | RACK A | User A | |
| Paper 1 | PAPER | XXXX/XX/XX | AAAAAA.Doc | RACK A | RACK A | | |
| Paper 1 | PAPER | XXXX/XX/XX | AAAAAA.Doc | DOOR A | RACK A | | |
| Paper 1 | PAPER | XXXX/XX/XX | AAAAAA.Doc | DOOR B | RACK A | | |
| Paper 1 | PAPER | XXXX/XX/XX | AAAAAA.Doc | RACK B | RACK A | | |
| | | | | | | | |
| | | | | | | | |

STORAGE TIME GRAPH (UNIT: HOUR)

MANAGEMENT APPARATUS, MANAGEMENT SYSTEM, OBJECT MANAGEMENT METHOD, AND COMPUTER-READABLE STORAGE MEDIUM

CROSS-REFERENCE TO RELATED APPLICATION

The present application claims priority to and incorporates by reference the entire contents of Japanese Patent Application No. 2013-192432 filed in Japan on Sep. 17, 2013.

BACKGROUND OF THE INVENTION

1. Field of the Invention

The present invention relates to a management apparatus, a management system, an object management method, and a computer-readable storage medium.

2. Description of the Related Art

In recent years, known has been a technique of using radio frequency identification (RFID) and managing an object by associating the object with information regarding the object, and there is a need for a management apparatus, a management system, an object management method, and a computer-readable storage medium which enable a management on whether or not an object as a management target is stored at a predetermined location.

SUMMARY OF THE INVENTION

It is an object of the present invention to at least partially solve the problems in the conventional technology.

According to an embodiment, there is provided a management apparatus that includes a search part that requests a plurality of communication devices to search for a terminal device to obtain search information from a communication device that detects the terminal device via communication. The search information includes object identifying information for identifying an object to be managed to which the terminal device is attached, location information regarding a location where the object locates, and storage location information indicating a storage location of the object. The terminal device stores the object identifying information and the storage location information. The management apparatus also includes a determination part that determines whether the object is stored at the storage location based on the search information; and an output part that outputs a result of the determination.

According to another embodiment, there is provided a management system that includes a plurality of communication devices; and a management apparatus. The management apparatus includes a search part that requests the communication devices to search for a terminal device to obtain search information from a communication device that detects the terminal device via communication. The search information includes object identifying information for identifying an object to be managed to which the terminal device is attached, location information regarding a location where the object locates, and storage location information indicating a storage location of the object. The terminal device stores the object identifying information and the storage location information. The management apparatus also includes a determination part that determines whether the object is stored at the storage location based on the search information; and an output part that outputs a result of the determination. Each of the communication devices includes a storage part that stores the location information; and a control part that, when succeeding in communication with the terminal device, detects the terminal device, obtains the object identifying information and the storage location information from the detected terminal device, obtains the location information from the storage part to generate the search information, and transmits the search information to the management apparatus.

According to still another embodiment, there is provided an object management method that includes requesting a plurality of communication devices to search for a terminal device to obtain search information from a communication device that detects the terminal device via communication, the search information including object identifying information for identifying an object to be managed to which the terminal device is attached, location information regarding a location where the object locates, and storage location information indicating a storage location of the object, the terminal device storing the object identifying information and the storage location information; determining whether the object is stored at the storage location based on the search information; and outputting a result of the determination.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 shows an example of search information according to the embodiment;

FIG. 7 shows an example of search information according to the embodiment;

FIG. 9 shows an example of management information in the case of the transference path shown in FIG. 8;

FIG. 13 shows an example of management information in the case of the transference path shown in FIG. 12;

DETAILED DESCRIPTION OF THE PREFERRED EMBODIMENTS

A management apparatus, a management system, an object management method, and a computer-readable storage medium according to the present invention will be explained in detail below with reference to the accompanying drawings.

Figure 1:
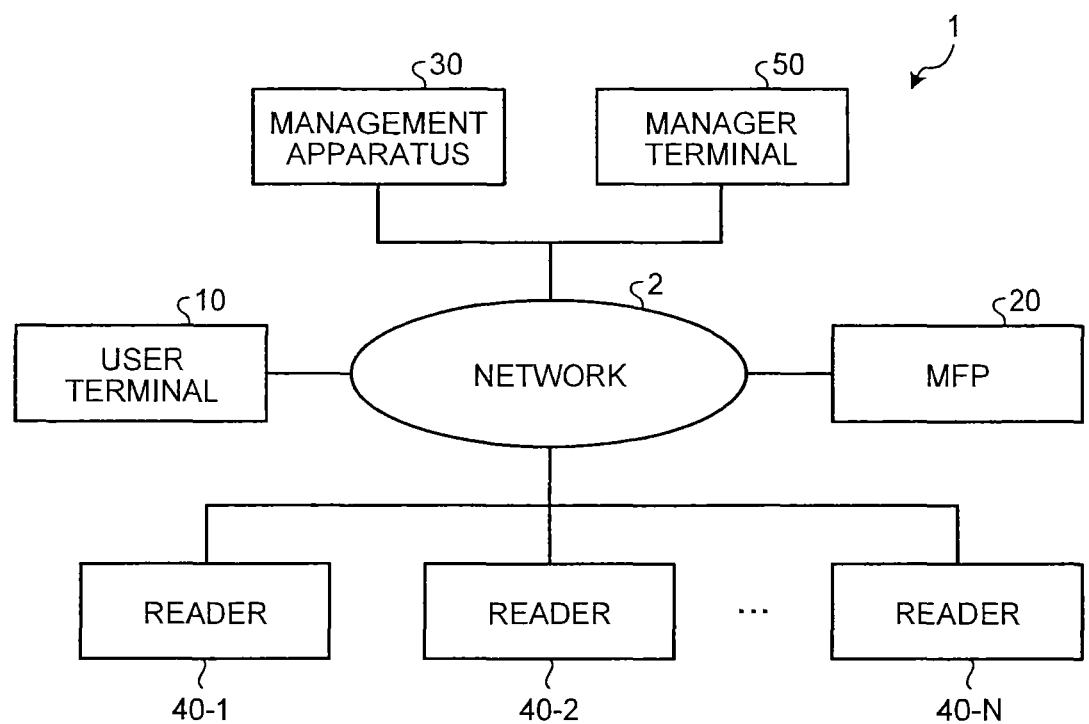
FIG. 1 is a block diagram of an example of a configuration of a management system according to an embodiment.

FIG. 1 is a block diagram of an example of a configuration of a management system 1 according to an embodiment. As shown in FIG. 1, a management system 1 is provided with a user terminal 10, a multifunction peripheral (MFP) 20, a management apparatus 30, readers 40-1 to 40-N (N≥1), and a manager terminal 50.

The user terminal 10, the MFP 20 (an example of a plurality of communication devices), the management apparatus 30, the readers 40-1 to 40-N (examples of a plurality of communication devices, i.e., reading devices), and the manager terminal 50 are connected via a network 2. The network 2 is, for example, realized by the Internet, a local area network (LAN), and the like. The readers 40-1 to 40-N are simply referred to as "reader 40" in the explanation below when there is no necessity of discrimination thereamong.

In the embodiment, the management apparatus 30 is provided at a service center of a service providing company that provides a management service of an object as a management target, and the user terminal 10, the MFP 20, the readers 40-1 to 40-N, and the manager terminal 50 are provided at a service position. However, the location of the management apparatus 30 is not limited to the service center and may be the service position, and the location of the manager terminal 50 is not limited to the service position and may be the service center.

The service position indicates an area in which an object as a management target is stored and corresponds to an office of a company that receives the management service. While the object as a management target is a printed material to which a terminal device is attached and the terminal device is radio frequency identification (RFID), the present invention is not limited thereto.

It is only necessary that the object as the management target is an object to which a terminal device is attached, and the object as the management target may be information processing devices such as a personal computer (PC) of a notebook type, and a tablet terminal, image forming devices such as a printer, a copying machine, a multifunction peripheral, a scanner, and a facsimile device, and electronic devices of various kinds such as a projector, a camera, an air conditioner, a refrigerator, a fluorescent light, an automatic vending machine, and a hand-held terminal. Here, the object as the management target is preferably portable.

Figure 2:
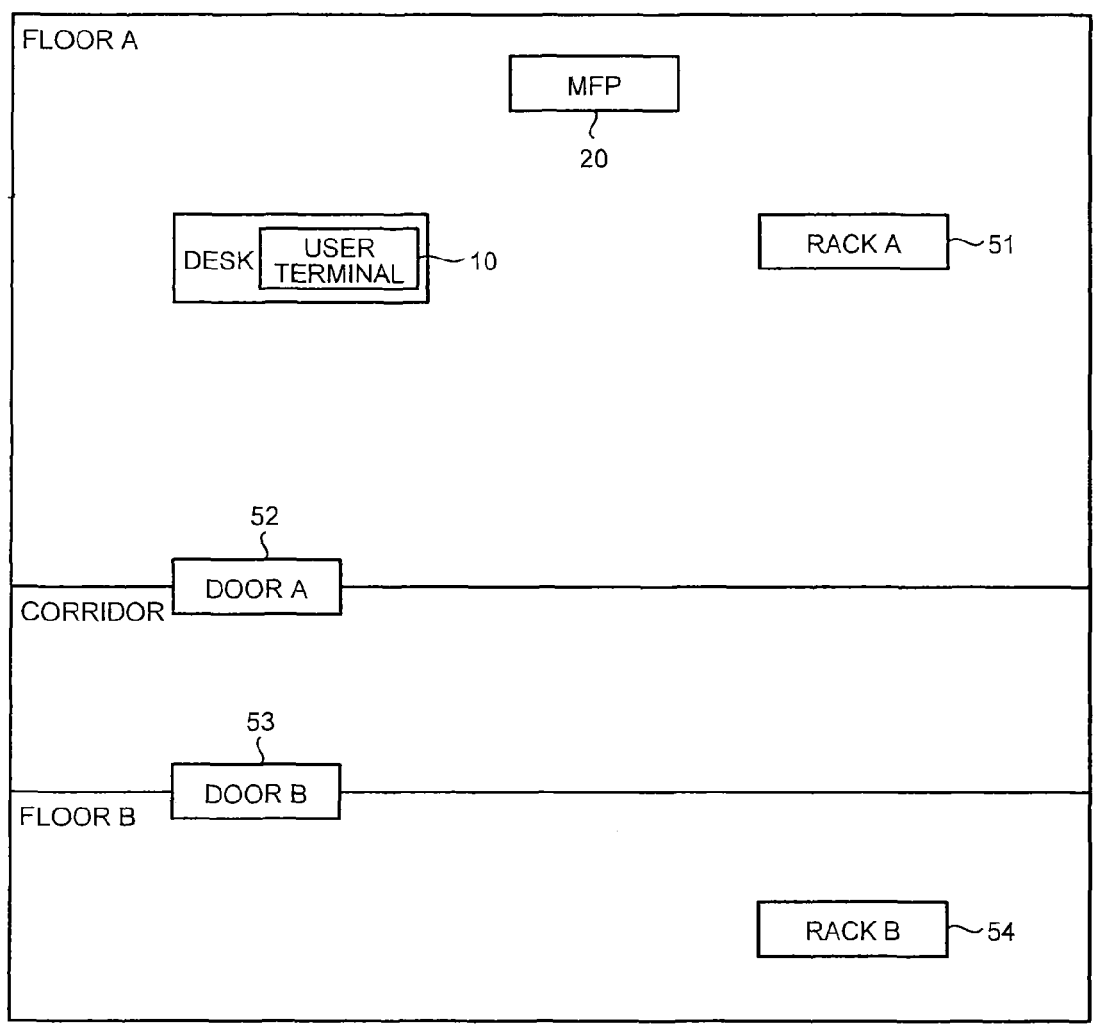
FIG. 2 shows an arrangement example of a service position according to the embodiment.

FIG. 2 shows an arrangement example of the service position according to the embodiment. As shown in FIG. 2, the user terminal 10, the MFP 20, and a rack A51 are arranged on a floor A, a door A52 is arranged at a border between the floor A and a corridor, a door B53 is arranged at a border between the corridor and a floor B, and a rack B54 is arranged on the floor B. The rack A51, the door A52, the door B53, and the rack B54 are configured to incorporate the reader 40.

Figure 3:
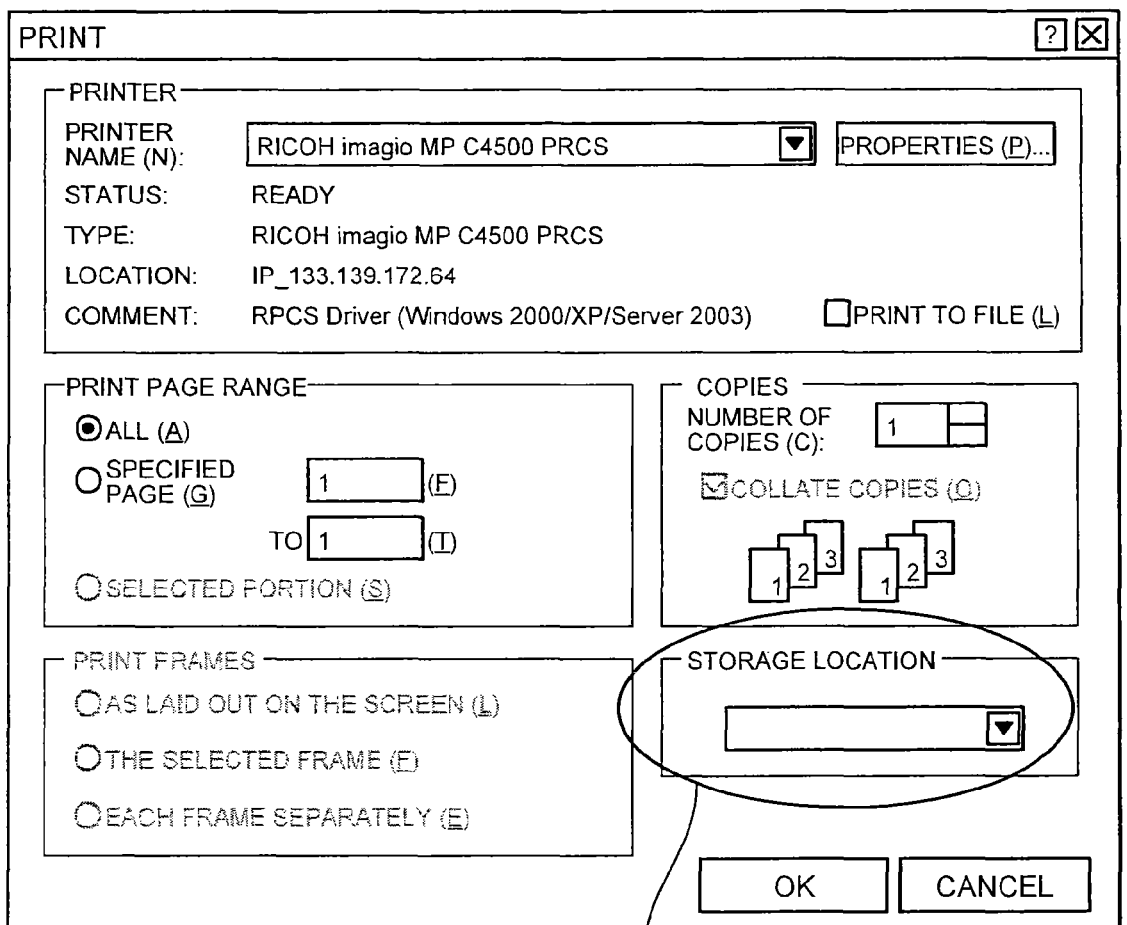
FIG. 3 shows an example of a print setting screen according to the embodiment.

The user terminal 10 instructs the MFP 20 to perform printing and a personal computer (PC) is taken as an example. In the embodiment, the user terminal 10 sets a storage location (the rack A51 or the rack B54, for example) of the printed material in a pull-down menu 201 of the print setting screen shown in FIG. 3 in instructing the MFP 20 to perform printing, for example.

The MFP 20 receives a print instruction from the user terminal 10 and performs printing on recording paper to which an RFID is attached to generate a printed material with the RFID. The MFP 20 according to the embodiment, which is provided with a reading/writing function (reader/writer) that is capable of a communication with the RFID through a close-range wireless communication and reads/writes information with respect to the RFID through the close-range wireless communication, performs reading an ID (an example of object identifying information to be used for identifying a printed material with the ID) stored in advance in the RFID and writing storage location information indicating a storage location specified by the print instruction from the user terminal 10 to the RFID.

For example, when receiving the print instruction from the user terminal 10, the MFP 20 generates a printed material to which an RFID is attached, reads an ID from the RFID, and writes time and date information, a name of a file as a print target, storage location information, and the like to the RFID. The MFP 20 generates and transmits to the management apparatus 30 management information in which location information regarding a location where the printed material locates is added in addition to the ID, the time and date information, the file name, and the storage location information.

Here, the time and date information indicates time and date when the MFP 20 performs a communication with the RFID for the writing to the RFID and corresponds to time and date of the printing. The location information included in the management information generated by the MFP 20 may be any information regarding the location where the MFP 20 locates, and the latitude and the longitude of the location where the MFP 20 locates, a name of the MFP 20, and an ID of the reader/writer provided in the MFP 20 are taken as examples. The MFP 20 may write the location information in the RFID, too.

The management information is not limited thereto and may further include type information ("paper" when the object is a printed material or "device" when the object is a projector, for example) indicating a type (kind) of the object as the management target and user information, for example.

Here, the MFP 20 may be a printer or a copying machine as long as it is an image forming device.

The management apparatus 30 manages the object as the management target and can be realized by a computer and the like in which an object management program to be explained later is installed.

Figure 4:
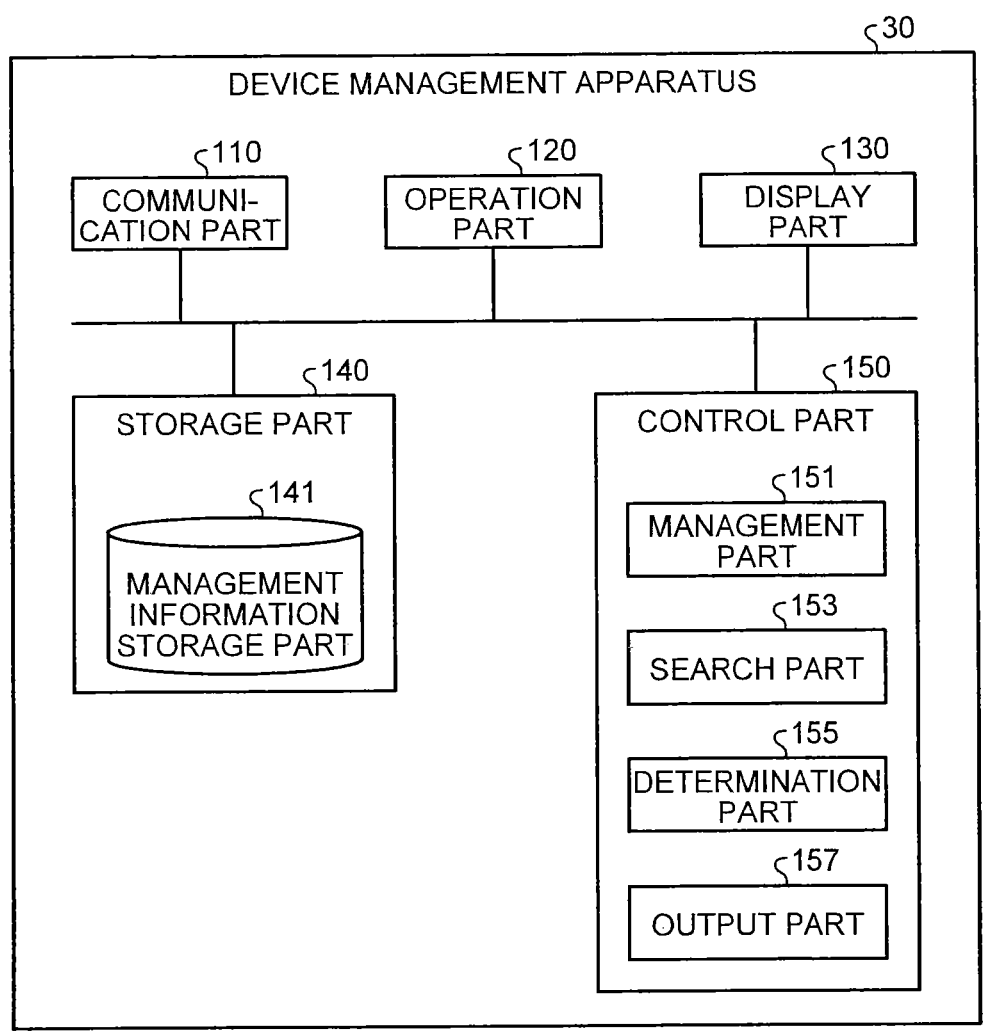
FIG. 4 is a block diagram of an example of a configuration of a management apparatus according to the embodiment.

FIG. 4 is a block diagram of an example of a configuration of the management apparatus 30 according to the embodiment. As shown in FIG. 4, the management apparatus 30 is provided with a communication part 110, an operation part 120, a display part 130, a storage part 140, and a control part 150.

The communication part 110, which communicates with external devices such as the MFP 20, the readers 40-1 to 40-N, and the manager terminal 50 via the network 2, can be realized by a network interface card (NIC) and the like.

The operation part 120, which performs inputs of various operations, can be realized by input devices such as a keyset, a mouse, a touch pad, and a touch screen.

The display part 130, which displays screens of various kinds, can be realized by display devices such as a liquid crystal display and a touch screen type display.

The storage part 140 stores various kinds of programs such as the object management program to be executed by the management apparatus 30 and data to be used in various kinds of processes to be performed in the management apparatus 30. The storage part 140 can be realized by at least one of storage devices capable of magnetic, optical, or electric storage such as a hard disk drive (HDD), a solid state drive (SSD), a memory card, an optical disk, a read only memory (ROM), and a random access memory (RAM). The storage part 140 includes a management information storage part 141. The management information storage part 141 will be explained later.

The control part 150, which controls components of the management apparatus 30, can be realized by a control device such as a central processing unit (CPU). The control part 150 is provided with a management part 151, a search part 153, a determination part 155, and an output part 157. Here, the control part 150 runs (executes) the object management program stored in the storage part 140 to realize the management part 151, the search part 153, the determination part 155, and the output part 157 as a software.

The management part 151 obtains, from the MFP 20 or the reader 40 that detects the RFID, the management information including the ID, the time and date information, the location information, and the storage location information of the RFID each time when the MFP 20 and the reader 40 detect the RFID attached to the printed material via communication and manages the management information on the management information storage part 141.

When a source of the obtainment of the management information is the MFP 20, the time and date information indicates time and date when the MFP 20 communicates with the RFID for the writing onto the RFID (time and date of the printing) and the location information corresponds to information regarding the location where the MFP 20 locates. When the source of the obtainment of the management information is the reader 40, the time and date information indicates time and date when the reader 40 communicates with the RFID for reading from the RFID, the location information may be any information regarding the location where the reader 40 locates, and the latitude and the longitude of the location where the reader 40 locates, the name of the reader 40, the ID of the reader/writer provided in the reader 40, and the like and the like are taken as examples.

The management information is not limited thereto and may further include a file name, type information, user information, and the like.

The search part 153 requests the MFP 20 and the reader 40 to search for the RFID attached to the printed material as a search target and obtains search information including the ID, the location information, and the storage location information of the RFID from the MFP 20 or the reader 40 that detects the RFID via communication. For example, the search part 153 specifies the ID of the RFID attached to the printed material as the search target and requests the MFP 20 and the reader 40 to search for the printed material as the search target.

The search information is not limited thereto and may further include time and date information, a file name, type information, user information, and the like.

The determination part 155 determines whether or not the printed material as the search target is stored at a storage location based on the search information of the printed material, searched by the search part 153, as the search target.

Specifically, the determination part 155 determines that the printed material is stored at the storage location when a storage location indicated in the storage location information of the search information searched by the search part 153 corresponds to a location indicated in the location information. On the other hand, when the storage location indicated in the storage location information of the search information searched by the search part 153 does not correspond to the location indicated in the location information, the determination part 155 determines that the printed material is not stored at the storage location.

The determination part 155 determines that the printed material as the search target is missing when the search information from either of the MFP 20 or the reader 40 is not obtained by the search part 153, i.e., when the printed material as the search target is not searched by the search part 153.

The output part 157 outputs a result of the determination of the determination part 155. When the printed material as the search target is determined to be missing by the determination part 155, the output part 157 further outputs transference history information that indicates a transference history of the printed material as the search target based on the management information stored in the management information storage part 141. For example, the output part 157 outputs to the manager terminal 50 the result of the determination of the determination part 155.

The reader 40 is capable of communicating with the RFID attached to the printed material via a close-range wireless communication and has a function of reading information of the RFID via the close-range wireless communication. The reader 40 may be a reader/writer similarly to the reader/writer provided in the MFP 20.

The MFP 20 including the reader/writer also has a configuration of the reader 40 to be explained below. Therefore, a content of the reader 40 to be explained below applies to the MFP 20, too.

Figure 5:
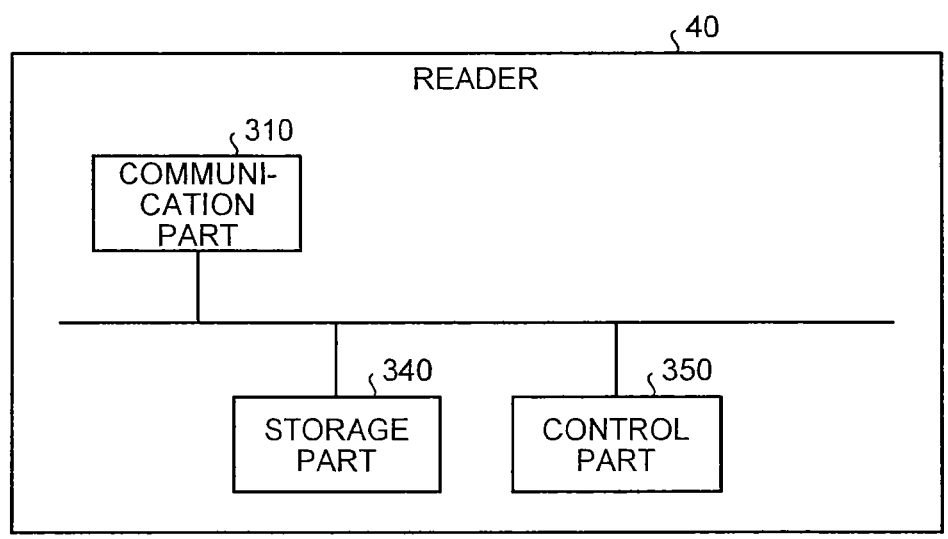
FIG. 5 is a block diagram of an example of a configuration of a reader according to the embodiment.

FIG. 5 is a block diagram of an example of a configuration of the reader 40 according to the embodiment. As shown in FIG. 5, the reader 40 is provided with a communication part 310, a storage part 340, and a control part 350

The communication part 310, which communicates with an external device such as the management apparatus 30 via the network 2, can be realized by the NIC and the like.

The storage part 340 stores various kinds of programs to be executed by the reader 40 and data including location information to be used in various kinds of processes to be performed in the reader 40.

The control part 350 detects the RFID via the close-range wireless communication when a distance to the RFID attached to the printed material comes within a certain range. When detecting the RFID, the control part 350 reads the ID and the storage location information form the RFID, generates time and date information, obtains the location information from the storage part 340 to generate management information, and transmits the management information to the management apparatus 30.

The management information is not limited thereto and may further include a file name, type information, user information, and the like, for example. The reader 40 may write the location information onto the RFID when provided with a writing function.

When being requested by the management apparatus 30 to search for the RFID attached to the printed material as the search target, the control part 350 specifies the ID of the RFID and starts the close-range wireless communication with respect to a certain range. Here, when the RFID attached to the printed material as the search target is present within the certain range, the control part 350 succeeds in the close-range wireless communication with the RFID and is thus able to detect the RFID attached to the printed material as the search target. When detecting the RFID, the control part 350 reads the ID, the file name, and the storage location information from the RFID and obtains the location information from the storage part 340 to generate the management information, and transmits the management information to the management apparatus 30.

The search information is not limited thereto and may further include time and date information, a file name, type information, user information, and the like, for example. The reader 40 may write the location information onto the RFID when provided with a writing function.

Next, a specific example of the embodiment will be explained.

FIGS. 6 and 7 show examples of search information according to the embodiment.

In the example shown in FIG. 6, the search part 153 obtains the search information from the reader 40 incorporated in the rack A as a result of the request to search for the RFID attached to the printed material as the search target, so that the storage location indicated in the storage location information corresponds, as being at the rack A, to the location indicated in the location information. Therefore, the determination part 155 determines a normal state at which the printed material is stored at the storage location and the output part 157 outputs a message "stored suitably" for the normal state.

In the example in FIG. 7, the search part 153 obtains the search information from the reader 40 incorporated in the rack B as a result of the request to search for the RFID attached to the printed material as the search target, so that the storage location indicated in the storage location information and the location indicated in the location information are different, as being at the rack A and the rack B, respectively. Therefore, the determination part 155 determines an abnormal state at which the printed material is not stored at the storage location and the output part 157 outputs a message "stored at a different location" for the abnormal state.

Figure 8:
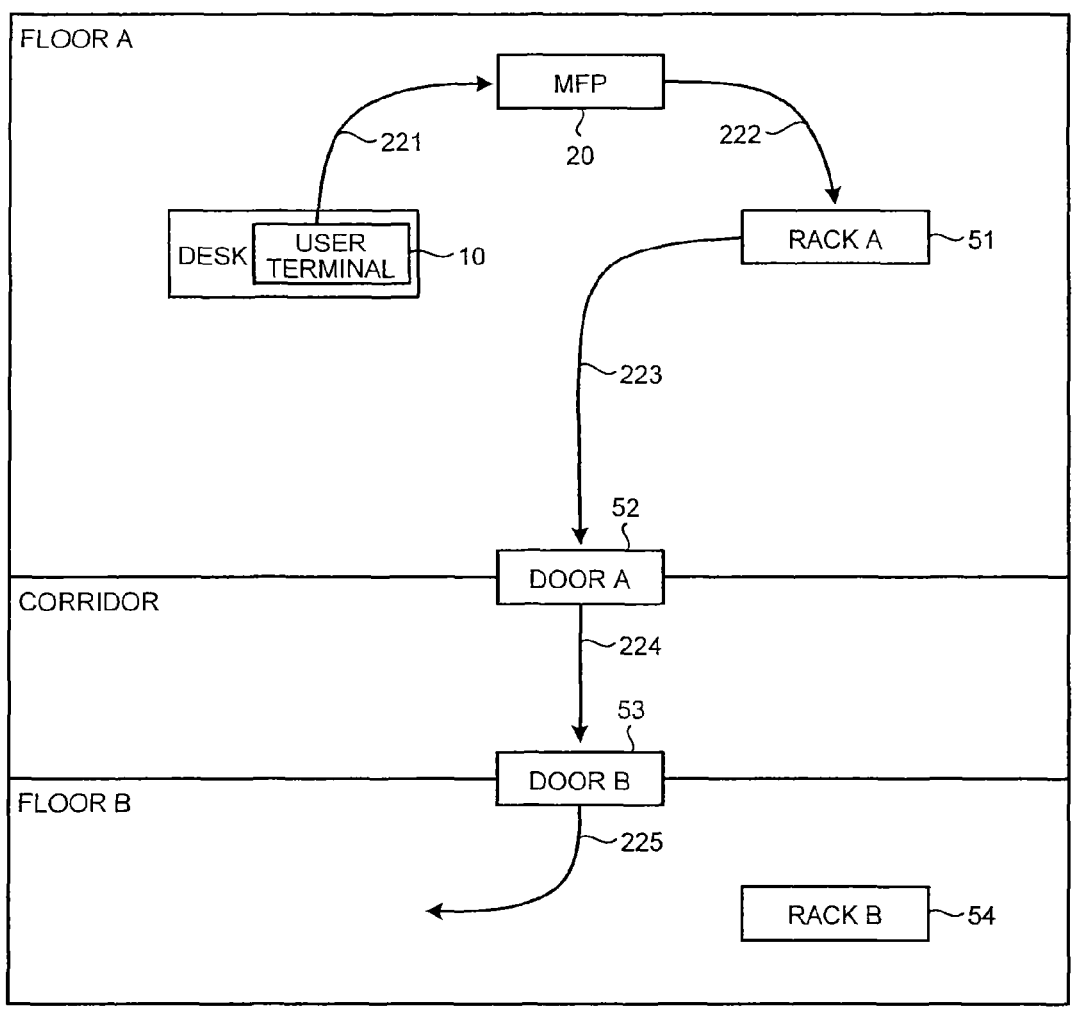
FIG. 8 shows an example of a transference path of a printed material as a search target according to the embodiment.

FIG. 8 shows an example of a transference path of the printed material as the search target according to the embodiment. FIG. 9 shows an example of management information in the case of the transference path shown in FIG. 8. Since the printed material as the search target is carried by a user along the path shown by arrows 221 to 225 (strictly speaking, not printed material but print data is transferred via communication at the phase shown by the arrow 221) in the example shown in FIG. 8, management information is generated by the MFP 20, the rack A51, the door A52, and the door B53 and the management information as shown in FIG. 9 is managed, by the management part 151, on the management information storage part 141.

Since the printed material as the search target is left on the floor B (left at an outside of the certain range from both readers 40 of the door B53 and the rack B54) in the example shown in FIGS. 8 and 9, the search part 153 is not able to obtain search information from any reader 40 even by the request to search for the RFID attached to the printed material as the search target. Therefore, the determination part 155 determines that the printed material as the search target is missing and the output part 157 outputs a message to the effect that the printed material is missing and transference history information based on the management information shown in FIG. 9. The transference history information may be the management information exactly shown in FIG. 9 and may be map information indicating a transference path of the printed material as the search target as shown in FIG. 8 based on the management information shown in FIG. 9.

Figure 10:
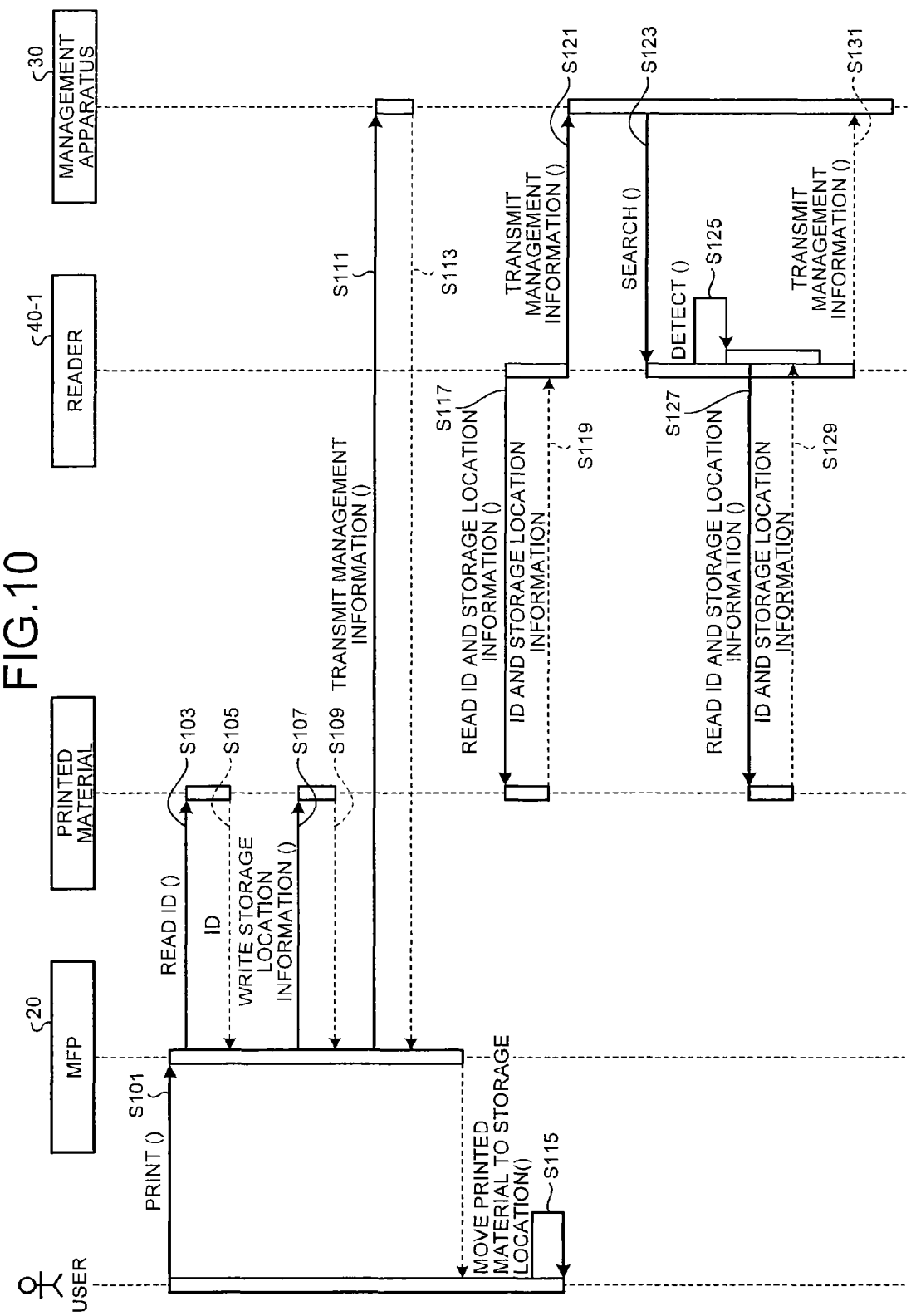
FIG. 10 is a sequence diagram of an example of a process to be executed in the management system according to the embodiment.

FIG. 10 is a sequence diagram of an example of a process to be executed in the management system 1 according to the embodiment.

The MFP 20 first performs printing onto recording paper to which an RFID is attached to generate a printed material with the RFID based on the print instruction from the user terminal 10 (step S101).

The MFP 20 then reads an ID stored in advance in the RFID attached to the generated printed material (steps S103 and S105) and writes storage location information indicating a storage location specified by the print instruction from the user terminal 10, time and date information, a file name, and the like to the RFID (steps S107 and S109).

The MFP 20 then generates and transmits to the management apparatus 30 management information in which information of the location that the MFP 20 manages is added in addition to the ID, the time and date information, the file name, and the storage location information (steps S111 and S113). The management part 151 of the management apparatus 30 obtains and manages on the management information storage part 141 the management information.

The user who had instructed the printing moves the generated printed material to the rack A51 to store it at the storage location (the rack A51 here) specified in the print instruction (step S115).

When the printed material is stored at the rack A51, the distance to the RFID attached to the printed material comes within the certain range, the control part 350 of the reader 40-1 incorporated in the rack A51 then detects the RFID via the close-range wireless communication and reads the ID, the file name, and the storage location information (steps S117 and S119), generates time and date information, obtains location information from the storage part 340 to generate management information, and transmits the management information to the management apparatus 30 (step S121). The management part 151 of the management apparatus 30 obtains and manages on the management information storage part 141 the management information.

Then, the search part 153 of the management apparatus 30 specifies the ID of the RFID attached to the printed material as the search target and requests the MFP 20 and the reader 40 to search for the RFID attached to the printed material as the search target (step S123). The process associated with this request for search is shown for the reader 40-1 and processes for the other readers 40 and the MFP 20 will be omitted, here.

When requested by the management apparatus 30 to search for the RFID attached to the printed material as the search target, the control part 350 of the reader 40-1 specifies the ID of the RFID and starts the close-range wireless communication with respect to the certain range.

Since the RFID attached to the printed material as the search target is present within the certain range here, the control part 350 succeeds in the close-range wireless communication with the RFID and detects the RFID attached to the printed material as the search target (step S125).

When detecting the RFID, the control part 350 then reads the ID, the file name, and the storage location information from the RFID (steps S127 and S129), obtains the location information from the storage part 340 to generate search information, and transmits the search information to the management apparatus 30 (step S131).

Figure 11:
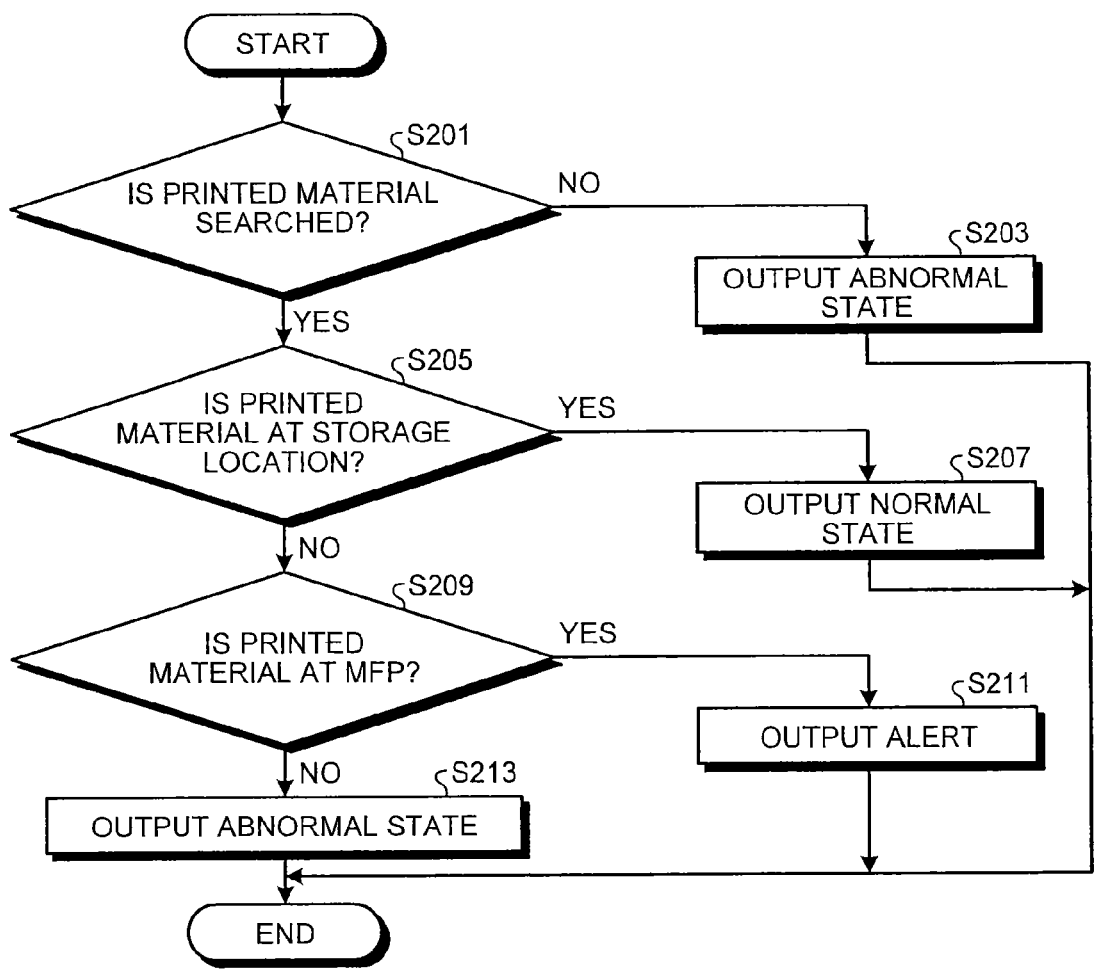
FIG. 11 is a flowchart of an example of a determination process and an output process to be executed in the management apparatus according to the embodiment.

FIG. 11 is a flowchart of an example of a determination process and an output process to be executed in the management apparatus 30 according to the embodiment.

The determination part 155 first determines the abnormal state at which the printed material as the search target is missing when the printed material as the search target is not searched by the search part 153 ("No" at step S201) and the output part 157 outputs the abnormal state (step S203). For example, the output part 157 outputs the message to the effect that the target is missing and the transference history information based on the management information.

When the printed material as the search target is searched by the search part 153 ("Yes" at step S201), the determination part 155 then determines whether or not the printed material as the search target is stored at the storage location (step S205).

When the printed material is stored at the storage location ("Yes" at step S205), the determination part 155 determines the normal state at which the printed material is stored at the storage location and output part 157 outputs the normal state (step S207). For example, the output part 157 outputs the message "stored suitably".

When the printed material as the search target is not stored at the storage location ("No" at step S205), the determination part 155 determines whether or not the printed material as the search target is at the MFP based on the location information (step S209).

When the printed material as the search target is at the MFP ("Yes" at step S209), the determination part 155 determines the abnormal state at which the printed material is not stored at the storage location and the output part 157 outputs an alert (step S211). For example, the output part 157 outputs a message "left at MFP".

When the printed material as the search target is not at the MFP ("No" at step S209), the determination part 155 determines the abnormal state at which the printed material is not stored at the storage location and the output part 157 outputs an alert for the abnormal state (step S213). For example, the output part 157 outputs the message "stored at a different storage location".

According to the embodiment as explained so far, it is possible, by storing storage location information of an object as a management target in a terminal device attached to the object and obtaining search information including object identifying information, location information regarding a location where the object locates, and storage location information in searching for the object, to perform a management on whether or not the object is stored at the storage location based on the search information.

Especially according to the embodiment, it is possible for a manager to easily recognize unfair taking out of an object and an information leakage associated with the unfair taking out of the object since a management on whether or not the object is stored at a storage location can be automated.

Besides, according to the embodiment, since management information including object identifying information, time and data information, location information, and storage location information is accumulated each time when an object is detected, it is possible by referring to the management information when the object cannot be searched to grasp a transference history and the like of the object and to contribute to a tracking of the object unfairly taken out.

MODIFICATIONS

The present invention is not limited to the embodiment and various modifications may be made.

First Modification

In the embodiment, the output part 157 may further output stay ratio information that indicates a stay ratio for each location where the object locates based on the management information.

Figure 12:
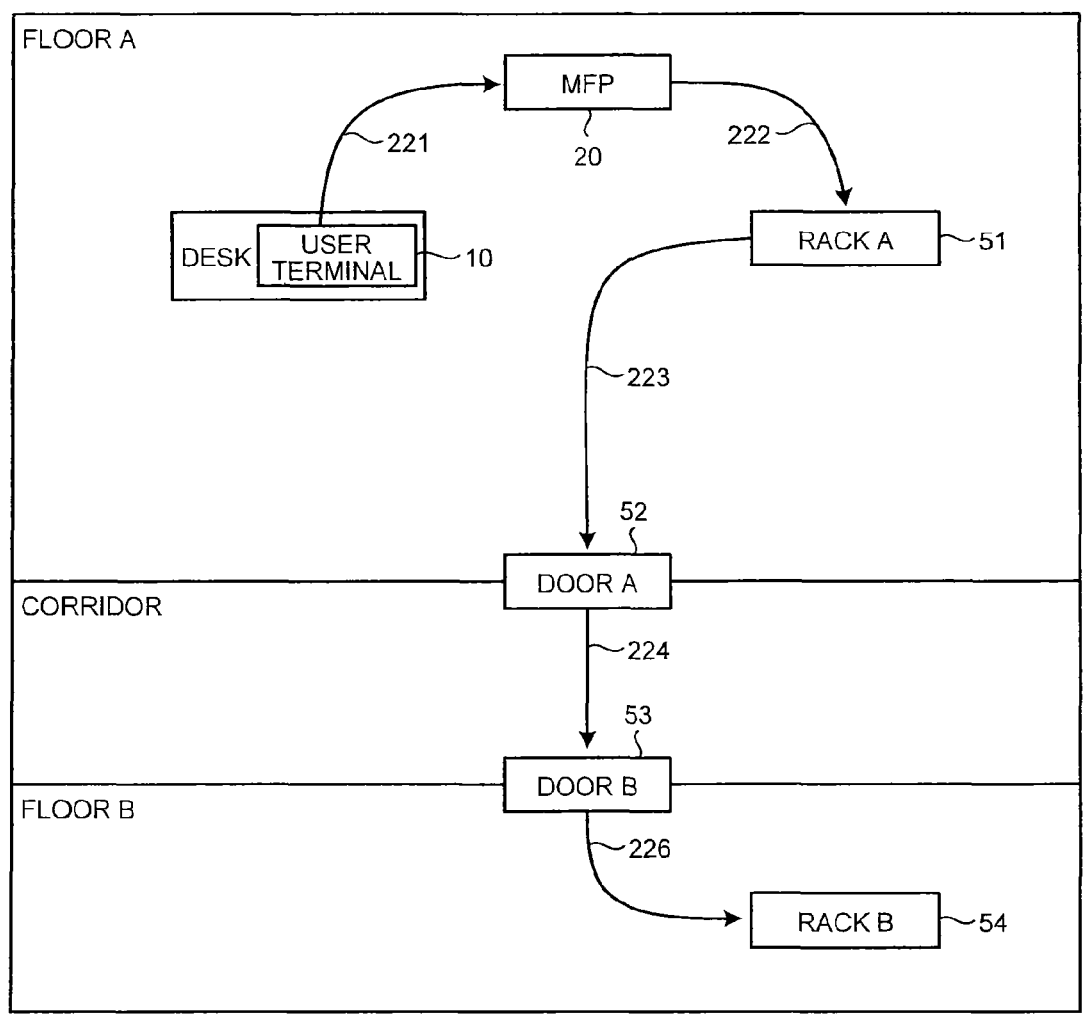
FIG. 12 shows an example of a transference path of a printed material as a search target according to a first modification.

FIG. 12 shows an example of a transference path of a printed material as a search target according to a first modification. FIG. 13 shows an example of management information in the case of the transference path shown in FIG. 12. Since the printed material as the search target is carried by a user along the path shown by the arrows 221 to 224 and an arrow 226 (strictly speaking, not printed material but print data is transferred via communication at the phase shown by the arrow 221) in the example shown in FIG. 12, management information is generated by the MFP 20, the rack A51, the door A52, the door B53, and the rack B54 and the management information as shown in FIG. 13 is managed, by the management part 151, on the management information storage part 141.

Figure 14:
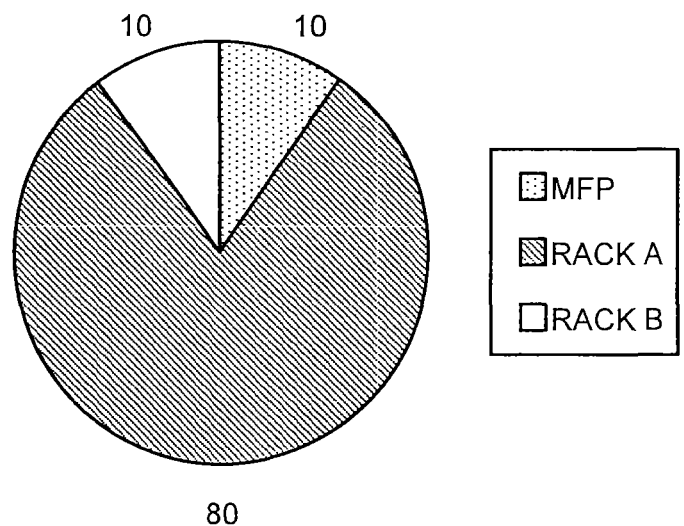
FIG. 14 shows an example of stay ratio information according to the embodiment.

Since the search part 153 obtain search information from the reader 40 incorporated in the rack B when requesting to search for the RFID attached to the printed material as the search target in the example shown in FIGS. 12 and 13, the storage location indicated in the storage location information and the location indicated in the location information are different, as being at the rack A and the rack B, respectively. Therefore, the determination part 155 determines the abnormal state at which the printed material is not stored at the storage location and the output part 157 outputs the message "stored at a different location" for the abnormal state. On this occasion, the output part 157 may output the stay ratio information shown in FIG. 14 based on the management information shown in FIG. 13. The stay ratio information shown in FIG. 14 shows a ratio of a stay time at each storage location and can be calculated based on the time and date information and the location information of the search information.

It is thus possible for a manager to grasp a ratio at which the object is properly stored at the storage location and a ratio at which the object is not properly stored at the storage location and to estimate an influence of unfair taking of the object and an information leakage associated with the taking out of the object.

Second Modification

While the example in which the object as the management target is a printed material is explained mainly in the embodiment, the object as the management target may be electronic devices of various kinds such as a projector to which a terminal device is attached as explained. In this case, it is only necessary for a manager and the like to manually register the storage location information to the terminal device.

Third Modification

When the rack A51 and the rack B52 can be locked electronically in the embodiment, information about being locked/unlocked may be obtained from a device (may be obtained from the reader 40 or other device different from the reader 40) that is incorporated in the rack A51 and the rack B52 and electronically controls the locking/unlocking, and managed as management information. This configuration allows the manager to estimate the influence of taking out of the object and the information leakage associated with the taking out of the object in more detail.

Hardware Configuration

Figure 15:
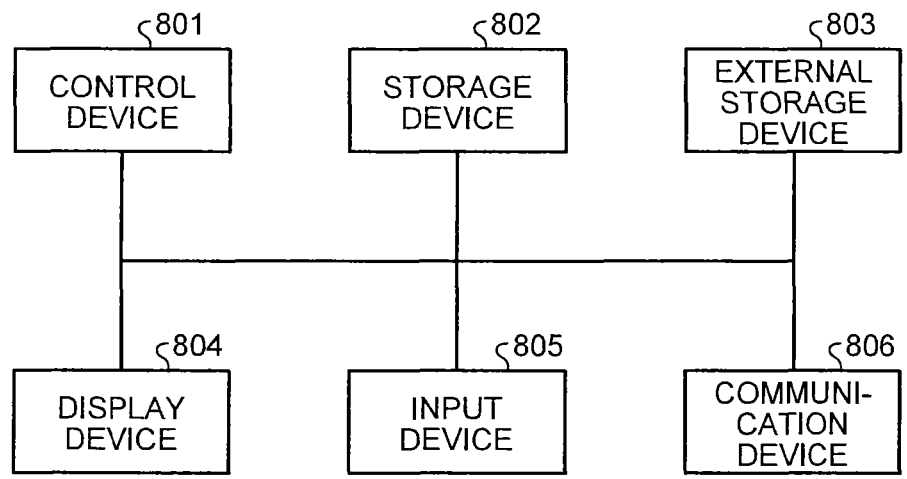
FIG. 15 is a block diagram of an example of a hardware configuration of each of devices in the embodiment and the modifications.

FIG. 15 is a block diagram of an example of a hardware configuration of the reader/writer provided in the MFP 20, the management apparatus 30, and the reader 40 according to the embodiment and the modifications (hereinafter referred to as "each of devices according to the embodiment and the modifications"). Each of devices according to the embodiment and the modifications is provided with: a control device 801 such as a CPU; a storage device 802 such as a ROM and a RAM; an external storage device 803 such as an HDD; a display device 804 such as a display; an input device 805 such as a keyset and a mouse; and a communication device 806 such as a communication interface, and has a hardware configuration using a normal computer.

Programs to be executed in each of devices according to the embodiment and the modifications may be provided by being recorded in a file of an installable format or of an executable format in a computer-readable storage medium such as a CD-ROM, a CD-R, a memory card, a digital versatile disk (DVD), and a flexible disk (FD).

The programs to be executed by each of devices according to the embodiment and the modifications may be provided by being stored on a computer connected to a network such as the Internet and downloaded via the network. Besides, the programs to be executed by each of devices according to the embodiment and the modifications may be provided or distributed via a network such as the Internet. Moreover, the programs to be executed by each of devices according to the embodiment and the modifications may be provided by being preloaded in a ROM and the like.

The programs to be executed by each of devices according to the embodiment and the modifications have a module configuration that enables the above-described components to be realized on a computer. As an actual hardware, the CPU reads out from the HDD onto the RAM and executes the programs, so that each component is realized on the computer.

According to the present invention, there is an advantage that whether or not an object as a management target is stored at a predetermined location can be managed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management apparatus comprising:
a processor configured to:
request a plurality of reading devices to search for a terminal device to obtain search information from a reading device that detects the terminal device via communication, the search information including object identifying information for identifying an object to be managed to which the terminal device is attached, location information regarding a location where the object locates currently, and storage location information indicating a storage location of the object that was set by a user terminal on a pull-down menu of a print setting screen when instructing a printing device to perform printing, the terminal device storing the object identifying information and the storage location information, and the reading device storing the location information;
determine whether the object is stored at the storage location based on the search information obtained from the plurality of reading devices; and
output a result of the determination, wherein
the reading devices are devices for reading, via communication, information stored in the terminal device,
the processor is further configured to:
obtain management information including the object identifying information, time and date information, the location information, and the storage location information;
manage the management information in a management information storage every time each of the reading devices detects the terminal device via communication; and
output transference history information indicating a transference history of the object based on the management information when it is determined that the object is missing,
the transference history information includes information representing at least one path and an arrow associated with the at least one path,
the at least one path and the arrow show where the terminal device was located at a first time and where the terminal device was located at a second time, and
the arrow points away from a first object associated with a first reading device where the terminal device was located at the first time, and the arrow points toward a second object associated with a second reading device where the terminal device was located at the second time.

2. The management apparatus according to claim 1, wherein the processor is further configured to:
determine that the object is stored at the storage location when the storage location indicated in the storage location information stored in the terminal device corresponds to the location indicated in the location information stored in the reading device, and
determine that the object is not stored at the storage location when the storage location indicated in the storage location information stored in the terminal device does not correspond to the location indicated in the location information stored in the reading device.

3. The management apparatus according to claim 1, wherein the processor is further configured to determine that the object is missing when the search information is not obtained from any one of the reading devices.

4. The management apparatus according to claim 1, wherein the processor is further configured to:
output stay ratio information indicating a stay ratio for each location where the object locates based on the management information.

5. The management apparatus according to claim 4, wherein the stay ratio includes at least one of a ratio at which the terminal device was properly stored at the storage location and a ratio at which the terminal device was not properly stored at the storage location.

6. The management apparatus according to claim 5, wherein the stay ratio includes the ratio at which the terminal device was properly stored at the storage location and the ratio at which the terminal device was not properly stored at the storage location.

7. The management apparatus according to claim 4, wherein the stay ratio information includes information for showing a percentage of time that the terminal device spent at a location.

8. The management apparatus according to claim 7, wherein the stay ratio information includes information for showing the percentage of time that the terminal device spent at each of a plurality of locations.

9. The management apparatus according to claim 1, wherein
the object is a printed material, and
the storage location information stored in the terminal device is written in printing in an image forming device.

10. The management apparatus according to claim 9, wherein the reading devices read, via communication, information stored in the image forming device.

11. The management apparatus according to claim 1, wherein the search information includes locked/unlocked information that includes information about an object, at the location where the terminal device locates, being locked/unlocked.

12. The management apparatus according to claim 11, wherein the reading device stores the locked/unlocked information.

13. The management apparatus according to claim 12, wherein the reading device controls unlocking/locking of the object.

14. A management system comprising:
a plurality of reading devices; and
a management apparatus, wherein
the management apparatus includes
a search part that requests the reading devices to search for a terminal device to obtain search information from a reading device that detects the terminal device via communication, the search information including object identifying information for identifying an object to be managed to which the terminal device is attached, location information regarding a location where the object locates currently, and storage location information indicating a storage location of the object that was set by a user terminal on a pull-down menu of a print setting screen when instructing a printing device to perform printing, the terminal device storing the object identifying information and the storage location information;
a determination part that determines whether the object is stored at the storage location based on the search information obtained from the plurality of reading devices; and
an output part that outputs a result of the determination,
each of the reading devices includes
a storage part that stores the location information; and
a control part that, when succeeding in communication with the terminal device, detects the terminal device, obtains the object identifying information and the storage location information from the detected terminal device, obtains the location information from the storage part to generate the search information, and transmits the search information to the management apparatus,
the reading devices are devices for reading, via communication, information stored in the terminal device,
the management apparatus further includes a management part that obtains management information including the object identifying information, time and date information, the location information, and the storage location information and that manages the management information in an management information storage part every time each of the reading devices detects the terminal device via communication,
the output part further outputs transference history information indicating a transference history of the object based on the management information when the determination part determines that the object is missing,
the transference history information includes information representing at least one path and an arrow associated with the at least one path,
the at least one path and the arrow show where the terminal device was located at a first time and where the terminal device was located at a second time, and
the arrow points away from a first object associated with a first reading device where the terminal device was located at the first time, and the arrow points toward a second object associated with a second reading device where the terminal device was located at the second time.

15. An object management method comprising:
requesting a plurality of reading devices to search for a terminal device to obtain search information from a reading device that detects the terminal device via communication, the search information including object identifying information for identifying an object to be managed to which the terminal device is attached, location information regarding a location where the object locates currently, and storage location information indicating a storage location of the object that was set by a user terminal on a pull-down menu of a print setting screen when instructing a printing device to perform printing, the terminal device storing the object identifying information and the storage location information, and the reading device storing the location information;
determining whether the object is stored at the storage location based on the search information obtained from the plurality of reading devices;
outputting a result of the determination;
obtaining management information including the object identifying information, time and date information, the location information, and the storage location information;
managing the management information in a management information storage every time each of the reading devices detects the terminal device via communication; and
outputting transference history information indicating a transference history of the object based on the management information when it is determined that the object is missing, wherein
the reading devices are devices for reading, via communication, information stored in the terminal device,
the transference history information includes information representing at least one path and an arrow associated with the at least one path,
the at least one path and the arrow show where the terminal device was located at a first time and where the terminal device was located at a second time, and
the arrow points away from a first object associated with a first reading device where the terminal device was located at the first time, and the arrow points toward a second object associated with a second reading device where the terminal device was located at the second time.

16. A non-transitory computer-readable storage medium with an executable program stored thereon and executed by a computer, wherein the program instructs the computer to execute the object management method according to claim 15.

* * * * *